United States Patent
Kaminski

(10) Patent No.: US 9,236,778 B2
(45) Date of Patent: Jan. 12, 2016

(54) GENERATOR ATTACHMENT ASSEMBLY AND METHOD

(71) Applicant: GM GLOBAL TECHNOLOGY OPERATIONS LLC, Detroit, MI (US)

(72) Inventor: Brian D. Kaminski, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 533 days.

(21) Appl. No.: 13/669,504

(22) Filed: Nov. 6, 2012

(65) Prior Publication Data

US 2014/0125177 A1 May 8, 2014

(51) Int. Cl.
*H02K 5/00* (2006.01)
*H02K 5/04* (2006.01)
*H02K 5/26* (2006.01)

(52) U.S. Cl.
CPC ... *H02K 5/04* (2013.01); *H02K 5/26* (2013.01)

(58) Field of Classification Search
USPC .................................................. 310/91, 89
See application file for complete search history.

(56) References Cited

U.S. PATENT DOCUMENTS

| | | | | |
|---|---|---|---|---|
| 4,376,535 | A | * | 3/1983 | Muselet et al. ............... 473/556 |
| 4,835,428 | A | * | 5/1989 | Komurasaki et al. ........ 310/68 D |
| 4,849,665 | A | * | 7/1989 | Kitamura et al. ............ 310/68 D |
| 5,686,773 | A | * | 11/1997 | Sakakibara et al. ............ 310/91 |
| 5,705,870 | A | * | 1/1998 | Thomsen et al. ............... 310/91 |
| 5,760,513 | A | * | 6/1998 | Morishita et al. .............. 310/91 |
| 5,773,906 | A | * | 6/1998 | Mukai et al. ................. 310/232 |
| 6,504,280 | B2 | * | 1/2003 | Trowbridge .................... 310/91 |
| 6,600,248 | B2 | * | 7/2003 | Hara et al. ....................... 310/91 |
| 8,506,435 | B2 | * | 8/2013 | Geraghty ...................... 474/101 |
| 2009/0085414 | A1 | * | 4/2009 | Itoh ................................ 310/42 |

* cited by examiner

*Primary Examiner* — Naishadh Desai
(74) *Attorney, Agent, or Firm* — Quinn Law Group, PLLC

(57) ABSTRACT

An attachment assembly for attaching a generator to a motor vehicle engine is provided. The assembly may include at least one engine attachment boss secured to the engine. The attachment assembly may further include a plurality of generator housing legs integrally formed with a generator housing. The assembly may further include a support dowel fitted, at a first end, within the bore located on the inner opposing side of one of the plurality of generator housing legs. The support dowel may be inserted, at a second end, into the bore of the at least one engine attachment boss, in order to couple the generator to the engine during assembly. This combination allows placement and fixation of the generator to the engine by a single operator without the need for an assembly assist device. A method for securing a generator to a motor vehicle engine is also provided.

18 Claims, 2 Drawing Sheets

US 9,236,778 B2

GENERATOR ATTACHMENT ASSEMBLY AND METHOD

TECHNICAL FIELD

The disclosure relates to a generator attachment assembly and more particularly to a self-supporting dowel assembly for attaching a generator to the engine of a motor vehicle.

BACKGROUND

Generators are used to convert mechanical energy into electrical energy. Generators may be permanently mounted to the engine of a motor vehicle to provide electricity to electronic vehicle components when the vehicle engine is turned on. Conventional mounts for securing a generator to the engine of a motor vehicle may include a plurality of bolts including a series of upper bolts proximate the engine cylinder head and a lower bolt proximate the engine block.

Conventional designs are configured to be placed and secured in one assembly step by a single operator. As vehicles continue to encompass additional electronic components, which may be run when the engine is turned off, the more powerful the generator must be to support those electronic components. Thus, conventional generators powerful enough to support the electronics of a modern vehicle often exceed the ergonomic assembly mass, of which a single operator is capable of placing, and, thus, an assembly assist device is required to place and secure the generator to the engine.

SUMMARY

An attachment assembly for attaching a generator to a motor vehicle engine is provided. The assembly may include at least one engine attachment boss secured to the motor vehicle engine. The attachment assembly may further include a plurality of generator housing legs attached to a generator housing.

The assembly may further include a support dowel. The support dowel may have a first end and a second end. The support dowel first end may be fitted within a bore defined by one of the plurality of generator housing legs. The support dowel second end may be inserted into a bore defined by the at least one engine attachment boss in order to allow the generator to be placed and coupled with the motor vehicle engine by a single operator without the need for an assembly assist device.

A method for securing a generator, having a generator housing, to a motor vehicle engine is also provided. The method comprises the steps of inserting a first end of a support dowel into a bore defined by one of a plurality of generator housing legs, wherein the plurality of generator housing legs are integrally formed to the generator housing; and inserting a second end of the support dowel into a bore defined by at least one engine attachment boss, wherein the attachment of the generator to the at least one attachment boss by the support dowel integrally couples one of the plurality of generator housing legs to the at least one engine attachment boss to place and couple the generator to the motor vehicle engine during assembly.

The method may further include the steps of: disposing a securing component within a first and second bore defined by each of the plurality of generator housing legs, a third bore defined by the support dowel, and the fourth bore defined by the at least one engine attachment boss, wherein the securing component has a first end and a second end; and fastening the securing component with a retention component, wherein the retention component is configured to receive the securing component second end and be inserted within the bore defined by one of the generator housing legs to fasten the generator to the motor vehicle engine.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
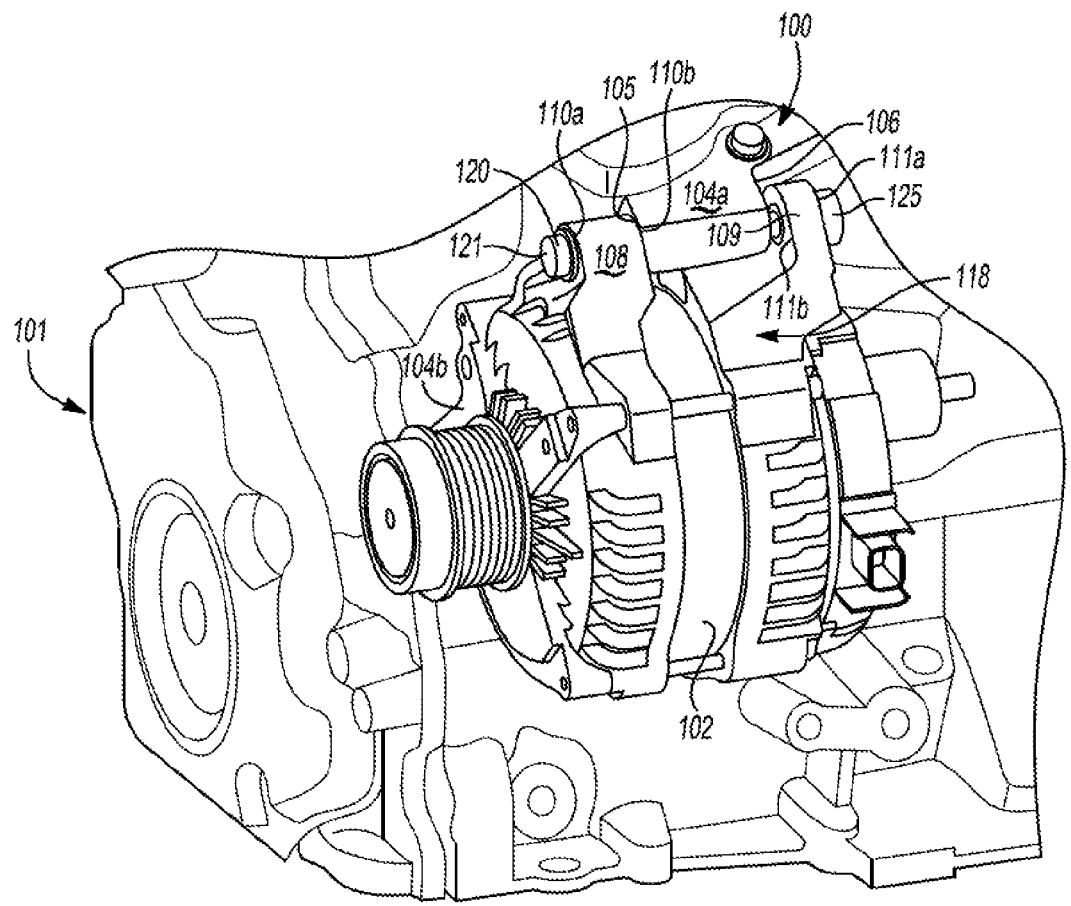
FIG. 1 is a schematic perspective view of a generator affixed to the engine of a front wheel drive vehicle using the self-supporting assembly dowel.
Figure 2:
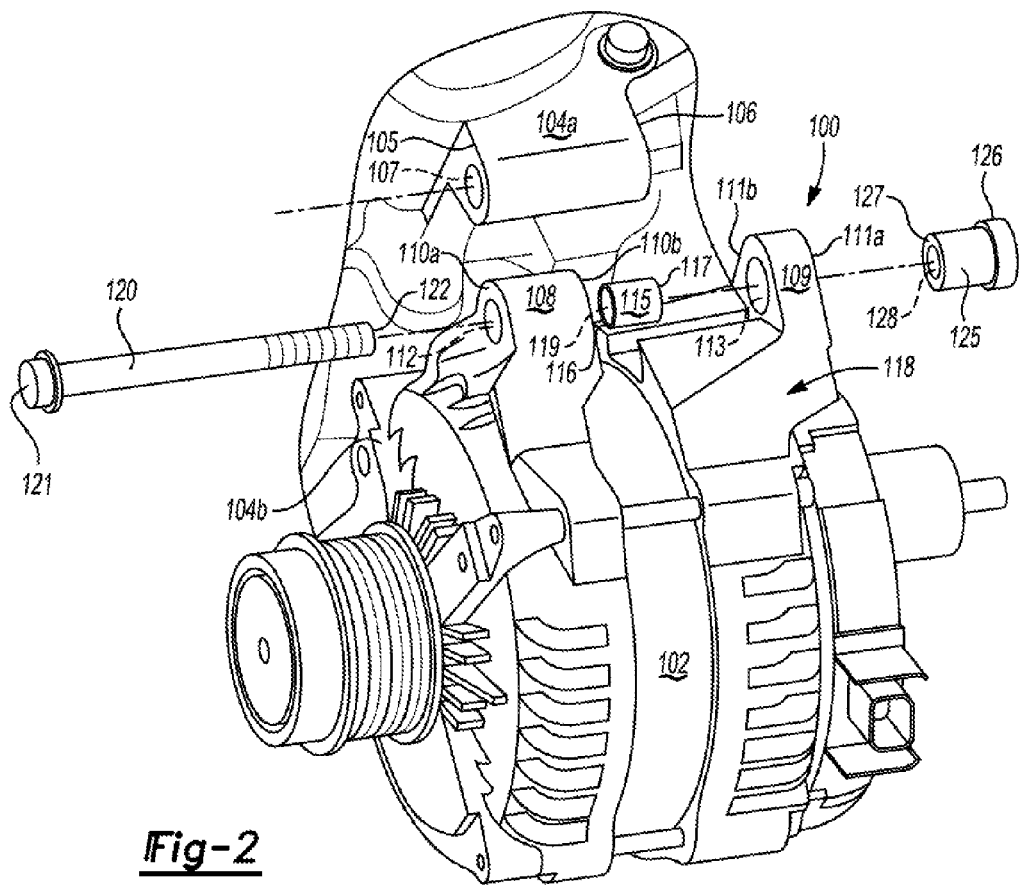
FIG. 2 is a schematic exploded view of the self-supporting assembly dowel shown to secure a generator to the engine of a front-wheel drive vehicle.
Figure 3:
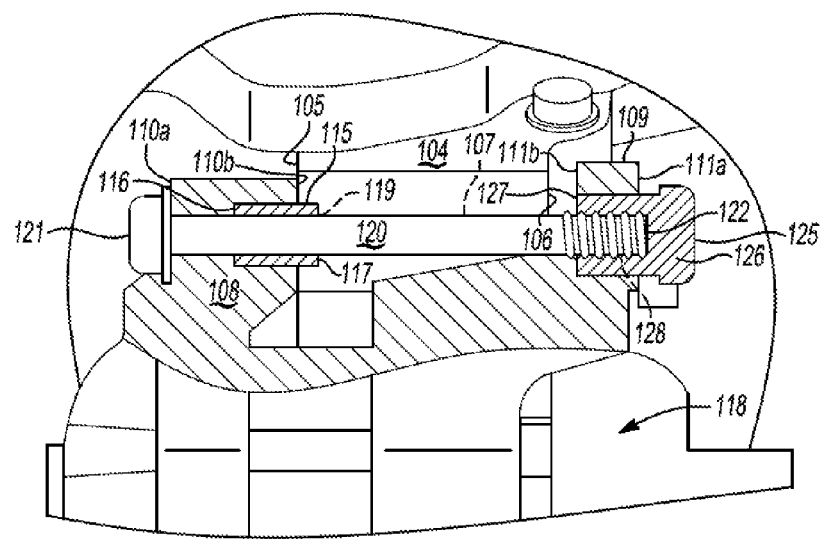
FIG. 3 is a schematic cross-sectional view of the self-supporting assembly dowel cross-sectioned through the first generator attachment boss.

Referring to the drawings, wherein like reference numerals refer to like components, FIGS. 1-3 depict an attachment assembly 100 for attaching a generator 102 to a motor vehicle engine 101. A method for attaching the generator 102 to the engine 101 of a vehicle is also provided.

Referring to FIG. 1, the generator 102 may be capable of providing power to the electronic components of the vehicle when engine 101 is turned on. The generator 102 may be a generator 102 of any mass and power output, but importantly may include generators that have a mass in excess of five kilograms, including, for example, a 220 amp generator 102 with a mass of 7.1 kilograms as shown in FIG. 1. The generator 102 may be encased in a generator housing 118.

Referring further to FIG. 1, the attachment assembly 100 may include at least one engine attachment boss 104*a* secured to the motor vehicle engine 101. In one example, the assembly 100 may include an engine attachment boss 104*a* attached to the engine block. In another example, the assembly 100 may include a first engine attachment boss 104*a* attached to the engine block and a second engine attachment boss 104*b* attached to the engine cylinder head.

Referring to FIGS. 2 and 3, the at least one engine attachment boss 104 may have an attachment boss first end 105 and an attachment boss second end 106. The at least one engine attachment boss 104 may also define a first bore 107 therethrough extending between the attachment boss first end 105 and the attachment boss second end 106.

The attachment assembly 100 may further include a plurality of generator housing legs 108, 109 integrally formed to the generator housing 118. The plurality of generator housing legs 108, 109 may include a first leg 108 and a second leg 109. The first leg 108 may have first a set of opposing sides 110*a*, 110*b*. The first set of opposing sides 110*a*, 110*b* may include an inner opposing side 110*b* and an outer opposing side 110*a*. The first leg 108 may also define a second bore 112 therethrough extending between the first set of opposing sides 110*a*, 110*b*. The second leg 109 may have a second set of opposing sides 111*a*, 111*b*. The second set of opposing sides 111*a*, 111*b* may include an inner opposing side 111*b* and an outer opposing side 111*a*. The second leg 109 may also define a third bore 113 therethrough extending between the second set of opposing sides 111*a*, 111*b*. The first 108 and second 109 generator housing legs may be configured to be placed on either side of the engine attachment boss 104a. The inner opposing side 110b of first generator housing leg 108 may be placed adjacent the engine attachment boss 104 first end 105 and the inner opposing side 111b of the second generator housing leg 109 may be placed adjacent to the engine attachment boss 104a second end 106.

The assembly 100 may further include a support dowel 115. The support dowel 115 may have a first end 116 and a second end 117. The support dowel 115 may define a fourth bore 119 therethrough extending between the first end 116 and the second end 117. One end 116, 117 of the support dowel 115 may be fitted within the second bore 112 or third bore 113 at the inner opposing side 110b, 111b of one of the first generator housing leg 108 and second generator housing leg 109.

One end 116, 117 of the support dowel 115 may be inserted into the first bore 107 defined by the at least one engine attachment boss 104a at one of the attachment boss first end 105 and the attachment boss second end 106.

In a front wheel drive example, the support dowel 115 first end 116 may be inserted into the second bore 112 defined by the first generator housing leg 108 at the inner opposing side 110b. The second end 117 of the support dowel 115 may be inserted into the first bore 107 defined by the engine attachment boss 104 at the engine attachment boss 104 first end 105.

In a rear wheel drive example, the support dowel 115 second end 117 may be inserted into the third bore 113 defined by the second generator housing leg 109 at the inner opposing side 111b. The first end 116 of the support dowel 115 may be inserted into the first bore 107 defined by the engine attachment boss 104a at the engine attachment boss 104a second end 106.

The support dowel 115 may be configured to couple the generator 102 to the motor vehicle engine 101 for placement during assembly. The support dowel 115 is capable of supporting the weight of the generator 102, after placement, during assembly before the generator 102 is fully secured to the engine 101. As the amount of electronic components in motor vehicles increases, the increased number of electronic components requires a larger and more powerful generator 102 to supply power to the electronic components when the engine is turned on. The attachment assembly 100 including the support dowel 115 allows the placement and the securing of the generator 102 to the motor vehicle engine 101 by a single operator without the need for an assembly assist device. This is particularly beneficial for the assembly of vehicles, having a larger amount of electronic components, which require generators which exceed the ergonomic assembly mass for a single hand. Such advantages also reduce manufacturing capital and further provide an ergonomically workable design.

Referring again to FIGS. 2 and 3, the attachment assembly 100 may further include at least one securing component 120. The at least one securing component 120 may be a bolt or the like. The securing component 120 may have a first end 121 and a second end 122. Once the generator 102 has been placed for attachment to the engine 101 and is supported by the support dowel 115, the at least one securing component 120 may be disposed within each of the bore 107 of the at least one engine attachment boss 104a, the second bore 112 defined by the first generator housing leg 108, the fourth bore 119 defined by the support dowel 115, and the third bore 113 defined by the second generator housing leg 109.

The attachment assembly 100 may further include a retention component 125 for fastening the securing component 120 in place at the securing component second end 122. The retention component 125 may be configured to couple the securing component 120 second end 122 to one of the first generator attachment leg 108 and second generator attachment leg 109 at the outer opposing side 110a, 111a.

The retention component 125 may be a sliding sleeve nut or the like. The retention component 125 may have a first end 126, a second end 127, and define a cavity 128 between the first end 126 and second end 127. The second end 122 of the securing component 120 may be received by the cavity 128 to fasten the securing component 120. The second end 127 of the retention component 125 may be disposed within the second bore 112 or the third bore 113 defined by one of the plurality of generator housing legs 108, 109 at the outer opposing side 110a, 111a, to fasten the securing component 120 and retention component 125 in place and secure the generator 102 to the engine 101.

In a front wheel drive example, when the securing component 120 is disposed within each of the first bore 107 defined by the at least one engine attachment boss 104a, the second bore 112 defined by the first generator housing leg 108, the third bore 113 defined by the second generator housing leg 109, and the fourth bore 119 defined by the support dowel 115, the securing component 120 first end 121 may be adjacent to the outer opposing side 110a of the first generator housing leg 108 and the second end 122 may protrude from the outer opposing side 111a of the second generator housing leg 109. The retention component 125 may receive the second end 122 of the securing component 120. The second end 127 of the retention component 125 may be disposed within the third bore 113 defined by the second generator housing leg 109 at the outer opposing side 111a, to fasten the securing component 120 and retention component 125 in place.

In a rear wheel drive example, when the securing component 120 is disposed within each of the first bore 107 defined by the at least one engine attachment boss 104a, the second bore 112 defined by the first generator housing leg 108, the third bore 113 defined by the second generator housing leg 109, and the fourth bore 119 defined by the support dowel 115, the securing component 120 first end 121 may be adjacent to the outer opposing side 111a of the second generator housing leg 109 and the second end 122 may protrude from the outer opposing side 110a of the first generator housing leg 108. The retention component 125 may receive the second end 122 of the securing component 120. The second end 127 of the retention component 125 may be disposed within the second bore 112 defined by the first generator housing leg 108 at the outer opposing side 110a, to fasten the securing component 120 and retention component 125 in place.

A method for securing a generator 102 to a motor vehicle engine 101 is also provided. The method comprises the steps of: inserting a first end of a support dowel 115 into a bore 112, 113 defined by one of a plurality of generator housing legs 108, 109, wherein the plurality of generator housing legs 108, 109 includes a first leg 108 and a second leg 109 and wherein the plurality of generator housing legs 108,109 are integrally formed to the generator housing 118; and inserting a second end 117 of the support dowel 115 into a bore 107 defined by at least one engine attachment boss 104 to integrally couple one of the plurality of generator housing legs 108, 109 to the at least one engine attachment boss 104 to place the generator 102 during assembly.

The method may further comprise the steps of: disposing a securing component 120 within a bore 112, 113 defined by each of the plurality of generator housing legs 108, 109, the bore 119 defined by the support dowel 115, and the bore 107 defined by at least one engine attachment boss 104a, wherein the securing component 120 has a first end 121 and a second end 122; and fastening the securing component 120 with a retention component 125, wherein the retention component 125 is configured to receive the securing component 120 second end 122 and be inserted into a bore 112,113 defined one of the generator housing legs 108, 109 to fasten the generator 102 to the motor vehicle engine 101.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An attachment assembly for attaching a generator, having a generator housing, to a motor vehicle engine comprising:
    at least one engine attachment boss secured to the motor vehicle engine having an attachment boss first end and an attachment boss second end, the at least one engine attachment boss defining a first bore therethrough extending between the attachment boss first end and the attachment boss second end;
    a plurality of generator housing legs integrally formed to the generator housing, wherein the plurality of generator housing legs includes:
        a first generator housing leg having a set of first leg opposing sides including an inner opposing side and an outer opposing side, the first generator housing leg defining a second bore therethrough between the set of first leg opposing sides, and
        a second generator housing leg having a set of second leg opposing sides including an inner opposing side and an outer opposing side, the second generator housing leg defining a third bore therethrough between the set of second leg opposing sides;
    a support dowel having a first end and a second end and defining a fourth bore therethrough extending between the first end and second end, such that the support dowel is configured to place and couple the generator to the motor vehicle engine during assembly;
    wherein the first end of the support dowel is configured to be fitted within one of the second bore defined by the first generator housing leg at the inner opposing side of the first generator housing leg and the first bore defined by the at least one engine attachment boss at the attachment boss second end; and
    wherein the second end of the support dowel is configured to be inserted into one of the first bore defined by the at least one engine attachment boss at the attachment boss first end and the third bore defined by the second generator housing leg at the inner opposing side of the second generator housing leg.

2. The attachment assembly of claim 1 wherein the support dowel first end is fitted within the second bore defined by the first generator housing leg at the inner opposing side and wherein the support dowel second end is fitted within the first bore defined by the at least one engine attachment boss at the attachment boss first end.

3. The attachment assembly of claim 1 wherein the support dowel second end is fitted within the third bore defined by the second generator housing leg at the inner opposing side and wherein the support dowel first end is fitted within the first bore defined by the at least one engine attachment boss at the attachment boss second end.

4. The attachment assembly of claim 1 further comprising at least one securing component having a securing component first end and a securing component second end, the at least one securing component disposed within the first bore defined by the at least one engine attachment boss and the second bore and third bore defined by the plurality of generator housing legs, and the fourth bore defined by the support dowel.

5. The attachment assembly of claim 4 further comprising a retention component for fastening the securing component in place at the securing component second end, wherein retention component has a first end, a second end, and defining a cavity between the first end and second end, and wherein the retention component is configured to receive the second end of the securing component within the cavity to fasten the securing component in place.

6. The attachment assembly of claim 5 wherein the securing component is a bolt.

7. The attachment assembly of claim 5 wherein the retention component is a sliding sleeve nut.

8. The attachment assembly of claim 7 wherein the retention component second end is disposed within one of the second bore and third bore defined by the plurality of the generator housing legs at the outer opposing side.

9. A vehicle having a plurality of electronic components comprising:
    an engine;
    a generator capable of providing power to the electronic components of the vehicle, the generator having a generator housing configured to encase the generator;
    an attachment assembly configured to attach the generator to the engine, the attachment assembly including:
        at least one engine attachment boss secured to the engine having an attachment boss first end and an attachment boss second end, the at least one engine attachment boss defining a first bore therethrough extending between the attachment boss first end and the attachment boss second end;
        a plurality of generator housing legs integrally formed to the generator housing, wherein the plurality of generator housing legs includes:
            a first generator housing leg having a set of first leg opposing sides including an inner opposing side and an outer opposing side, the first leg defining a second bore therethrough between the set first leg opposing sides, and
            a second generator housing leg having a set of second leg opposing sides including an inner opposing side and outer opposing side, the second leg defining a third bore therethrough between the second leg opposing sides;
        a support dowel having a first end and a second end and defining a fourth bore therethrough extending between the first end and second end, wherein the support dowel first end is fitted within the second bore of the first generator housing leg at the inner opposing side of the first generator housing leg and the support dowel second end is fitted within the first bore of the at least one engine attachment boss at the attachment boss first end, such that the support dowel is configured to couple the generator to the engine during assembly.

10. The vehicle of claim 9 wherein the vehicle is a front wheel drive vehicle.

11. The vehicle of claim 9 further comprising at least one securing component having a securing component first end and a securing component second end, the at least one securing component disposed within the first bore defined by the at least one engine attachment boss, the second bore and third bore defined by the plurality of generator housing legs, and the fourth bore defined by the support dowel.

12. The vehicle of claim 11 further comprising a retention component for fastening the securing component in place at the securing component second end, wherein retention component has a first end, a second end, and defines a cavity between the first end and second end, and wherein the retention component is configured to receive the second end of the securing component within the cavity to fasten the securing component in place.

13. The vehicle of claim 12 wherein the retention component second end is disposed within the third bore defined by the second generator housing leg at the outer opposing side.

14. A vehicle having a plurality of electronic components comprising:
   an engine;
   a generator capable of providing power to the electronic components of the vehicle, the generator having a generator housing configured to encase the generator;
   an attachment assembly configured to attach the generator to the engine, the attachment assembly including:
      at least one engine attachment boss secured to the engine having an attachment boss first end and an attachment boss second end, the at least one engine attachment boss defining a first bore therethrough extending between the attachment boss first end and the attachment boss second end;
      a plurality of generator housing legs integrally formed to the generator housing, wherein the plurality of generator housing legs includes:
         a first generator housing leg having a set of first leg opposing sides including an inner opposing side and an outer opposing side, the first leg defining a second bore therethrough between the set first leg opposing sides, and
         a second generator housing leg having a set of second leg opposing sides including an inner opposing side and an outer opposing side, the second leg defining a third bore therethrough between the second leg opposing sides;
      a support dowel having a first end and a second end and defining a fourth bore therethrough extending between the first end and second end, wherein the support dowel first end is fitted within the third bore of the second generator housing leg at the inner opposing side of the second generator housing leg and wherein the support dowel second end is fitted within the first bore of the at least one engine attachment boss at the attachment boss second end, such that the support dowel is configured to couple the generator to the motor vehicle engine during assembly.

15. The vehicle of claim 14 wherein the vehicle is a rear wheel drive vehicle.

16. The vehicle of claim 15 further comprising at least one securing component having a securing component first end and a securing component second end, the at least one securing component disposed within the first bore defined by the at least one engine attachment boss, the second bore and third bore defined by the plurality of generator housing legs, and the fourth bore defined by the support dowel.

17. The vehicle of claim 16 further comprising a retention component for fastening the securing component in place at the securing component second end, wherein retention component has a first end, a second end, and defines a cavity between the first end and second end, and wherein the retention component is configured to receive the second end of the securing component within the cavity to fasten the securing component in place.

18. The vehicle of claim 17 wherein the retention component second end is disposed within the second bore defined by the first generator housing leg at the outer opposing side.

\* \* \* \* \*